United States Patent
Haugan

(10) Patent No.: US 11,539,302 B2
(45) Date of Patent: Dec. 27, 2022

(54) DIRECT ELECTRICAL HEATING ARRANGEMENT WITH A POWER ELECTRONIC CONVERTER

(71) Applicant: SIEMENS ENERGY AS, Oslo (NO)

(72) Inventor: Espen Haugan, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 356 days.

(21) Appl. No.: 16/855,358

(22) Filed: Apr. 22, 2020

(65) Prior Publication Data
US 2020/0252000 A1 Aug. 6, 2020

Related U.S. Application Data

(62) Division of application No. 14/237,062, filed as application No. PCT/EP2012/065511 on Aug. 8, 2012, now Pat. No. 10,666,157.

(30) Foreign Application Priority Data

Aug. 8, 2011 (EP) ...................................... 1176835

(51) Int. Cl.
*H02M 5/458* (2006.01)
*H02M 5/45* (2006.01)
*F16L 53/35* (2018.01)
*F16L 53/37* (2018.01)

(52) U.S. Cl.
CPC ............. *H02M 5/458* (2013.01); *F16L 53/35* (2018.01); *H02M 5/4505* (2013.01); *H02M 5/4585* (2013.01); *F16L 53/37* (2018.01)

(58) Field of Classification Search
CPC .. H02M 5/458; H02M 5/4505; H02M 5/4585; F16L 53/35
See application file for complete search history.

(56) References Cited

U.S. PATENT DOCUMENTS

| | | |
|---|---|---|
| 2,858,406 A | 10/1958 | Bruce |
| 6,052,293 A * | 4/2000 | Ivner ..................... H02M 5/458 363/36 |
| 6,278,095 B1 | 8/2001 | Bass et al. |
| 9,917,527 B2 * | 3/2018 | Boe ......................... H02M 5/14 |
| 2004/0240237 A1 | 12/2004 | Okayama et al. |

(Continued)

FOREIGN PATENT DOCUMENTS

| | | |
|---|---|---|
| JP | 2202324 | 8/1990 |
| WO | 9722174 | 6/1997 |

OTHER PUBLICATIONS

European Search Report dated Apr. 18, 2012 for corresponding EP Application No. 11176835.4-2207.

(Continued)

*Primary Examiner* — Kyle J Moody
*Assistant Examiner* — Lakaisha Jackson
(74) *Attorney, Agent, or Firm* — Wolter Van Dyke Davis, PLLC

(57) ABSTRACT

An arrangement provides an AC current to a load for direct electrical heating. The arrangement includes a AC-DC-AC converter cell. The converter cell has at least two converter input terminals connected to at least two transformer output terminals. The converter cell has a first converter output terminal and a second converter output terminal, wherein the first converter cell output terminal is adapted to be connected to the load.

4 Claims, 8 Drawing Sheets

(56) References Cited

U.S. PATENT DOCUMENTS

| | | |
|---|---|---|
| 2005/0111245 A1 | 5/2005 | Lai et al. |
| 2010/0142234 A1 | 6/2010 | Abolhassani et al. |
| 2011/0044077 A1 | 2/2011 | Nielsen |
| 2011/0156691 A1 | 6/2011 | Radan |

OTHER PUBLICATIONS

PCT International Search Report and Written Opinion of the International Searching Authority dated Sep. 20, 2013 for corresponding PCT International Application No. PCT/EP2012/065511.

* cited by examiner

DIRECT ELECTRICAL HEATING ARRANGEMENT WITH A POWER ELECTRONIC CONVERTER

RELATED CASES

The present patent document is a divisional application of U.S. application Ser. No. 14/237,062, filed Feb. 4, 2014, which is a § 371 nationalization of PCT Application Serial Number PCT/EP2012/065511, filed Aug. 8, 2012, designating the United States, which is hereby incorporated by reference. This patent document also claims the benefit of EP11176835, filed Aug. 8, 2011, which is also hereby incorporated by reference.

FIELD

The present embodiments relate to an arrangement for providing an AC current to a load for direct electrical heating of a pipeline portion, and to a pipeline heating arrangement.

BACKGROUND

Direct Electrical Heating (DEH) of subsea pipelines for gas production is a widely used method for preventing hydrate plugs in gas pipelines. The method is based on injecting a single phase AC current direct through the gas steel pipe and back through a cable strapped on the top of the pipe. This method can limit the use of inhibitors, such as methanol. The conventional way to create a single phase power supply suitable for the load (pipeline), is to use a 3 phase transformer with a balancing/compensating circuit on the transformer secondary windings. The balancing/compensating circuit has two capacitors and one inductor connected between the three different phases. The transformer will be subjected to a symmetrical three phase load with power factor close to 1, if these three impedances are properly matched to the pipeline impedance.

Do to the mentioned properties of the DEH system, the balancing circuit has drawbacks:
  Complex fine tuning of the circuit needs to be done during commissioning.
  High short circuit levels are seen at the single phase source terminals (e.g., danger of damage to the pipeline by burning hole in the pipeline in case of short circuit)
  Transformer with tapping is needed to change the heating power.
  Only the grid frequency is available in all modes

SUMMARY AND DESCRIPTION

There may be a need for an arrangement for providing an AC current to a load and for a pipeline heating arrangement, wherein the above mentioned disadvantages are reduced, such as where switch-on transients are reduced.

Further there may be a need for an arrangement, in particular a power electronic unit, to heat up subsea gas pipes during production shut downs and tail gas production without use of an output transformer connected after the power electronic unit.

This need may be met by a power electronic circuit for DEH. The circuit will have the same advantages as the state of the art technical solution and reduces some of the aforementioned disadvantages.

According to an embodiment, an arrangement provides an AC current (alternating electrical current) to a load (e.g., a pipe, a pipe system, a tube for transporting oil or gas) for direct electrical heating (e.g., of the pipe), wherein the arrangement is adapted to be used as a direct electrical heating power supply. Thereby, the arrangement includes a (just one or two, three or even more) AC-DC-AC converter cell (e.g., controllable power electronics components such as controllable switches), the converter cell having at least two converter input terminals (e.g., exactly two or three) connected to at least two transformer output terminals, the converter cell having a first converter output terminal and a second converter output terminal (e.g., for outputting the AC voltage (e.g., having a frequency different from the frequency of the AC voltage supplied to the transformer) for supplying energy to the load), wherein the first converter cell output terminal is adapted to be connected to the load, wherein at all three input terminals of the transformer, a symmetrical load is achieved by appropriately controlling the AC-DC-AC converter cell.

Thereby, the power output of the arrangement may be controlled to, in particular, adjust a heating power for heating a gas or oil pipeline. Further, the frequency of the AC voltage output by the arrangement may be different from the AC voltage provided at the inputs of the arrangement. Thereby, heating efficiency of the pipeline may be improved. In particular, it is not required to use a transformer with tabbing capability in order to change the heating power. Further, high short circuit levels at the load may be reduced or even avoided. Further, at all three input phases of the transformer, a symmetrical load may be achieved by appropriately controlling the AC-DC-AC converter cell.

Further, a symmetric three phase load may be achieved on the transformer, thereby requiring a less complex transformer for changing heating power.

According to an embodiment, the direct electrical heating power supply includes a transformer for transforming input voltages between three transformer input terminals connected to three primary windings (or four or five or six or seven or eight or even more, in particular, wound around a ferromagnetic material having high magnetic permeability) to three transformer output voltages at three secondary winding portions (e.g., inductively coupled to respective primary windings), the transformer having the at least two transformer output terminals (e.g., three or six or four or five or six or seven or even more);

According to an embodiment, the AC-DC-AC converter cell includes an AC-DC or rectifier section (e.g., one or more controllable switches and associated control circuits) having two DC output nodes and being adapted to provide a DC voltage (e.g., a direct current voltage having an alternating current voltage overlaid, such as ripple voltage) between the two DC output nodes, when an AC voltage having an input frequency is applied between the at least two converter input terminals; and a DC-AC section (e.g., one or more controllable switches and associated control circuits) having two DC input nodes connected to the two DC output nodes of the AC-DC section and being adapted to convert a DC voltage between the two DC output nodes to an AC voltage having an output frequency between the first converter output terminal and the second converter output terminal.

Thereby, the arrangement may be simplified and may be assembled from known components, like controllable power electronics components, such as diodes, transistors, thyristors and the like. Further, this provision may simplify controllability of power output, frequency of the power output and may avoid short circuits at the load.

According to an embodiment, the converter cell, such as the AC-DC section of the at least one converter cell, includes: a first controllable switch (e.g., a switch, wherein opening and closing may be controlled, in particular by a control signal); a second controllable switch, wherein the first controllable switch and the second controllable switch are connected in series between the two DC output nodes, wherein a first one of the at least two converter input terminals is connected between the first controllable switch and the second controllable switch.

Thereby, a controllable rectifier section may be provided. The controllable rectifier section may use conventional power electronics components. Thereby, controllability of the arrangement may be improved and the arrangement may be simplified.

According to an embodiment, at least one of the first controllable switch and the second controllable switch is a thyristor.

For example, the first controllable switch includes a thyristor and also the second controllable switch includes a thyristor. Opening and closing the thyristor may be controlled by an appropriate signal supplied to the gate of the respective thyristor.

For example, the thyristors may be controlled such that the current flowing to the DC output nodes may be at least approximately constant, such that, in particular, the voltage across the DC capacitor bank fluctuates. In particular, the voltage between the two DC output nodes may fluctuate with a frequency corresponding to two times the output frequency of the AC voltage output by the converter cell. In particular, when increasing the output frequency, the heating efficiency for heating the pipeline may increase. Thereby, heating power and/or heating efficiency may be controlled. Further, conventional thyristors may be used to simplify the arrangement and also to reduce the costs of the arrangement.

According to an embodiment, the converter cell, in particular the AC-DC section, further includes a capacitor, such as a capacitor for storing an electrical charge connected in parallel to the series connection of the first controllable switch and the second controllable switch.

Thereby, the voltage created by current flow through the thyristors (and, for example, further controllable switches connected to other converter input terminals of the at least two converter input terminals) may be smoothed. In particular, the capacitor may include one or more capacitor units connected in series and/or connected in parallel between the two DC output nodes. Thereby, the rectifier section may be improved.

According to an embodiment, the converter cell, in particular the AC-DC section, includes a third controllable switch; and a fourth controllable switch, wherein the third controllable switch and the fourth controllable switch are connected in series between the two DC output nodes, wherein a second one of the at least two converter input terminals is connected between the third controllable switch and the fourth controllable switch. In particular, the series connection of the first controllable switch and the second controllable switch is connected in parallel to the series connection of the third controllable switch and the fourth controllable switch.

Thereby, also the input voltage provided at the second one of the at least two converter input terminals may be rectified by the third controllable switch and the fourth controllable switch and a rectified voltage may be supplied to the two DC output nodes. Thereby, the power output of the arrangement may be increased.

According to an embodiment, the three secondary winding portions of the transformer are serially conductively connected in an annular manner, such that the three secondary winding portions are connected in series forming a loop, wherein the at least two transformer output terminals are formed by three transformer output terminals being provided between pairs of the three secondary winding portions (e.g., such that each secondary winding portion provides one output terminal), wherein the at least two converter input terminals are formed by three converter input terminals for supporting three phases, wherein the three transformer output terminals are connected to the three converter input terminals.

Thereby, a converter cell having three converter input terminals for supporting three electrical phases may be provided.

In particular, the first controllable switch, the second controllable switch, the third controllable switch and/or the fourth controllable switch and also the fifth controllable switch and/or the sixth controllable switch may be replaced by diodes, which may therefore not be controlled but may adapt a conducting state depending on the voltage applied across the respective diode.

According to an embodiment, at least one of the third controllable switch and the fourth controllable switch includes a thyristor.

Thereby, the arrangement may further be simplified and reduced in costs, since conventional components may be used.

According to an embodiment, the converter cell, in particular the AC-DC section, further includes a fifth controllable switch including a thyristor; a sixth controllable switch including a thyristor, wherein the fifth controllable switch and the sixth controllable switch are connected in series between the two DC output nodes, wherein a third one of the three converter input terminals is connected between the fifth controllable switch and the sixth controllable switch, wherein, for example, the series connection of the first controllable switch and the second controllable switch is connected in parallel to the series connection of the fifth controllable switch and the sixth controllable switch.

Thereby, an efficient rectifier section for supporting three phases may be provided using conventional electronic components.

According to an embodiment, the three secondary winding portions are conductively isolated from each other (e.g., formed by three separate wires wound around ferromagnetic material), wherein the at least two transformer output terminals are formed by three pairs of transformer output terminals (e.g., the transformer thus having in total six output terminals), wherein each of the three secondary winding portions provides one of the three pairs of transformer output terminals (e.g., each of the three secondary winding portions provides thus two transformer output terminals), wherein the at least two converter input terminals are formed by just two converter input terminals, wherein the just two converter input terminals are connected to a pair of transformer output terminals of the three pairs of transformer output terminals.

In particular, in total, three converter cells each having exactly two converter input terminals may be connected to the six transformer output terminals. For example, the three cells connected to the one transformer, may be connected in series at their output terminals. Thereby, the two cells at the two ends of the series connection of the three cells may provide two output terminals, which may be connected to the load.

According to an embodiment, at least one of the third controllable switch and the fourth controllable switch includes a transistor, such as a IGBT, wherein, for example, a diode is connected in parallel to the third controllable switch and, for example, another diode is connected in parallel to the fourth controllable switch.

Providing a transistor for the third controllable switch and/or the fourth controllable switch may improve controllability of the arrangement, in particular regarding power output and heating efficiency.

According to an embodiment, the arrangement having the transformer with six output terminals further includes another AC-DC-AC converter cell (e.g., configured as the AC-DC-AC converter cell as described), the other converter cell having just two other converter input terminals connected to another pair of transformer output terminals of the three pairs of transformer output terminals, the other converter cell having another first converter output terminal and another second converter output terminal; and still another AC-DC-AC converter cell (e.g., configured as the AC-DC-AC converter cell as described), the still other converter cell having just two still other converter input terminals connected to still another pair of transformer output terminals of the three pairs of transformer output terminals, the still other converter cell having still another first converter output terminal and still another second converter output terminal, wherein the load is connectable between the first converter output terminal and the still other second converter output terminal, wherein the second converter output terminal is connected to the first other converter output terminal, wherein the second other converter output terminal is connected to the still other first converter output terminal.

Thereby, a series connection of the converter cell, the other converter cell and the still other converter cell is provided for providing a single phase output (provided by two output terminals) to the load.

According to an embodiment, a series arrangement includes at least a first and a last series connected arrangement as described above.

By providing a series arrangement, an output voltage for driving the load may be (linearly) increased, such as to adapt the output voltage to the output voltage required by the load to heat the load. Thereby, a greater flexibility may be provided.

According to an embodiment, the series arrangement further includes a compensating capacitor either connectable in series or in parallel to the load.

By providing the capacitor, the power factor may be adjusted. In particular, the reactive power at the output may be compensated by the capacitor. Thereby, the capacitor may be placed either in series or in parallel with the load. If the capacitor is in series connected to the load, the output voltage may be kept lower and the current higher for the converter, compared to the case where the capacitor is connected in parallel with the load. If the capacitor is in parallel with the load, a small output choke may be put on the output of the converter, to limit the current in the capacitor bank when switching.

According to an embodiment, a pipeline heating arrangement includes an arrangement according to one of the embodiments as describe above; and an electrically conductive pipeline connected to the arrangement as a load at a first longitudinal position and a second longitudinal position for electrical current flow through the pipeline from the first position to the second position for heating the pipeline.

For example, the pipeline may be provided for transporting oil or gas. The pipeline may be manufactured from a metal, such as steel. The pipeline may have at least two terminals for connecting the output terminals of the heating arrangement to the first position and the second position, respectively.

Further, the arrangement for providing an AC current to a load, may include one or more gate control circuits for controlling at least one of the controllable switches, such that the electrical power provided at the converter output terminals, which power is supplied to the load, satisfies desired properties, for example, regarding power output or heating efficiency, frequency of the AC output voltage and the like. Further, the gate control circuits may be adapted to control, in particular the rectifier section of the converter cell, to achieve at least approximately homogeneous or same load to the three primary windings of the transformer. Thereby, a load of the three primary winding portions may be balanced. Thereby, the efficiency of the arrangement for providing an AC current may be improved.

According to an embodiment, an arrangement for providing an AC current to a load, such as for direct electrical heating, includes: a transformer for transforming input voltages between three transformer input terminals connected to three primary windings to three transformer output voltages between three pairs of transformer output terminals, each pair of transformer output terminals being connected to a respective secondary winding inductively coupled to one of the three primary windings; a first, a second and a third AC-DC-AC converter cell, each cell having two converter input terminals connected to a pair of the transformer output terminals, each cell having a first converter output terminal and a second converter output terminal, wherein the load is connectable between the first converter output terminal of the first converter cell and the second converter output terminal of the third converter cell, wherein the second converter output terminal of the first converter cell is connected to the first converter output terminal of the second converter cell and wherein the second converter output terminal of the second converter cell is connected to the first converter output terminal of the third converter cell.

According to an embodiment, a converter is employed in the DEH power supply which employs power electronics for conversion (e.g. Thyristors or IGBTs) and symmetrisation providing a similar function as a conventional symmetrisation unit as disclosed in WO 2010/031626. Using the converter, in particular the converters intermediate DC link, the single phase load of the pipeline section is transformed into a symmetric three phase load on the transformer. Further, a less complex transformer for changing the heating power may be provided, reduced short circuit currents at the single phase load.

A further embodiment provides a direct electrical heating power supply. The direct electrical heating power supply includes a converter including at least one AC-DC-AC converter cell, the converter cell having an AC-DC section, a DC link and a DC-AC section. The direct electrical heating power supply further includes a first, a second and a third AC converter input, wherein the first converter input is connectable to a first secondary winding of a three phase transformer, the second converter input is connectable to a second secondary winding of the three phase transformer, and the third converter input is connectable to a third secondary winding of the three phase transformer, and an AC converter output connectable to an electrically conductive pipeline section forming a single phase load for direct electrical heating of the pipeline section. The converter is configured supply AC electric power to the single phase load and to distribute the load equally between the first, the second and the third AC converter inputs.

In an embodiment of the direct electrical heating power supply, the converter may include at least three power cells, one power cell providing the first AC converter input, one power cell providing the second AC converter input and one power cell providing the third AC converter input. The output of the at least three power cells may be connected in series to provide the AC converter output. The converter can be configured to synchronize the generation of an AC voltage by the DC-AC sections of the at least three power cells to provide a single phase AC output at the AC converter output. For this purpose, a controller may be provided which controls the synchronization of the DC-AC sections of the at least three power cells.

In a further embodiment of the direct electrical heating power supply, the power cell may include three AC inputs which provide the first, the second and the third AC converter inputs. The AC-DC section of the converter cell can be configured to convert a three phase AC voltage received on the first, the second and the third AC converter inputs, such as from the transformer's secondaries, into a common DC voltage on the DC link. Thereby, the load on the first, the second and the third AC converter inputs may be symmetrized.

In other embodiments of the direct electrical heating power supply, the converter may be provided by the arrangement for providing an AC current in any of the above outlined embodiments and configurations.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The scope of the present invention is defined solely by the appended claims and is not affected to any degree by the statements within this summary.

DETAILED DESCRIPTION

Figure 1:
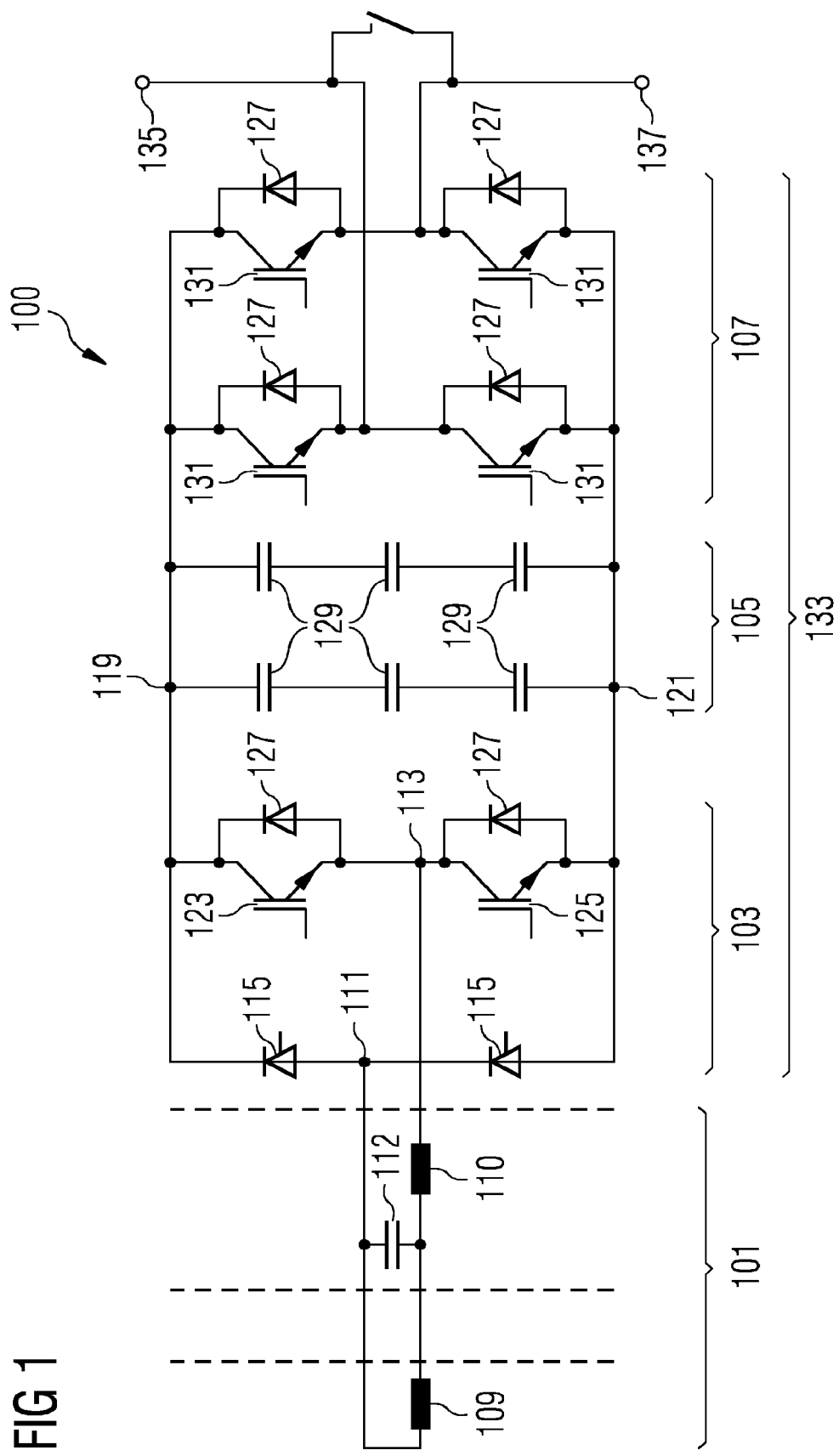
FIG. 1 schematically illustrates an arrangement for providing an AC current to a load according to an embodiment.

The illustrations in the drawings are in schematic form. It is noted that in different figures, similar or identical elements may be provided with the same reference signs or with reference signs, which are different from the corresponding reference signs only within the first digit.

FIG. 1 schematically illustrates an arrangement 100 for providing an AC current to a load, wherein the arrangement 100 includes a transformer portion 101, an AC-DC section 103, a capacitor arrangement or DC-link 105 and a DC-AC section 107. The arrangement 100 can form a direct electrical heating (DEH) power supply, and the AC-DC section 103, the DC-link 105 and the DC-AC section 107 can form a power cell 133 of a converter.

The transformer portion 101 includes a secondary winding portion 109, 110, which is inductively coupled to a not illustrated primary winding of a not completely illustrated transformer for transforming an AC input voltage to a higher AC output voltage. The portion 101 represents only a portion of a transformer, the complete transformer having three transformer input terminals connected to three primary windings, wherein each of the three primary windings is inductively coupled to a corresponding secondary winding portion 109, 110.

The secondary winding 109, 110 is here illustrated as including two sections 109, 110, but may also include only one section, in particular including a wire wound around a ferromagnetic material. Optionally, the secondary winding portion 109, 110 may include a capacitor 112 connected between the transformer output terminals 111, 113. The portion 109 is configured as an inductance representing a secondary winding of a transformer, while the portion 110 represents an additional inductor. The capacitor 112 is a filter capacitor. The choke and the capacitor 112 is not absolutely needed and may be omitted in other embodiments.

The transformer portion 101 has two transformer output terminals 111 and 113.

The AC-DC section 103 includes a first controllable switch 115 implemented as a thyristor; a second controllable switch 117, also implemented as a thyristor, wherein the first of the transformer output terminals 111 is connected between the thyristors 115, 117, which are connected in series between two DC output nodes 119, 121.

The second output terminal 113 of the two transformer output terminals is connected between a third controllable switch 123 and a fourth controllable switch 125, which are connected in series between the two DC output nodes 119, 121. The third controllable switch and the fourth controllable switch 123, 125 are implemented each as isolated gate bipolar transistor (IGBT). In parallel to the IGBTs 123, 125, diodes 127 are connected.

The capacitor section 105 includes two series connections of capacitors 129, wherein the two series connections of capacitors 129 are connected in parallel between the two DC output nodes 119, 121.

The DC-AC section 107 includes four transistors (in particular IGBTs) 131, wherein a series connection of two IGBTs 131 is connected between the two DC output nodes 119, 121. In parallel to the IGBTs 131, diodes 127 are arranged. Two series connections of two IGBTs 131 each are connected in parallel.

The AC-DC section 103, the capacitor section 105, and the DC-AC section 107 together form an AC-DC-AC converter cell 133. The AC-DC-AC converter cell 133 has a first converter output terminal 135 connected between a pair of serially connected IGBTs 131 and a second converter output terminal 137 connected between another pair of serially connected IGBTs 131.

In particular, FIG. 1 illustrates a converter cell topology with a single phase, switch mode rectifier 103.

The input transformer has one common primary winding and one secondary winding 109, 110 for each cell 133. Each cell 133 has a single phase input 111, 113. Therefore the cell converter should have a multiple of 3 cells in order to give symmetrical impact on the mains. The input IGBT's 123, 125 are pulse width modulation (PWM) controlled, and an input filter may be needed (e.g., similar to an Active Front End on a motor drive).

Using thyristors 115, 117 instead of diodes in the other phase 111 gives the possibility of soft start and cell isolation in the case of breakdown on the cell.

Since this rectifier section 103 produces a pulsating power to the capacitor section or DC link 105 with the double mains frequency, the DC capacitor 105 is capable of withstanding the sum of the pulsating power from the inverter and the rectifier.

Figure 2:
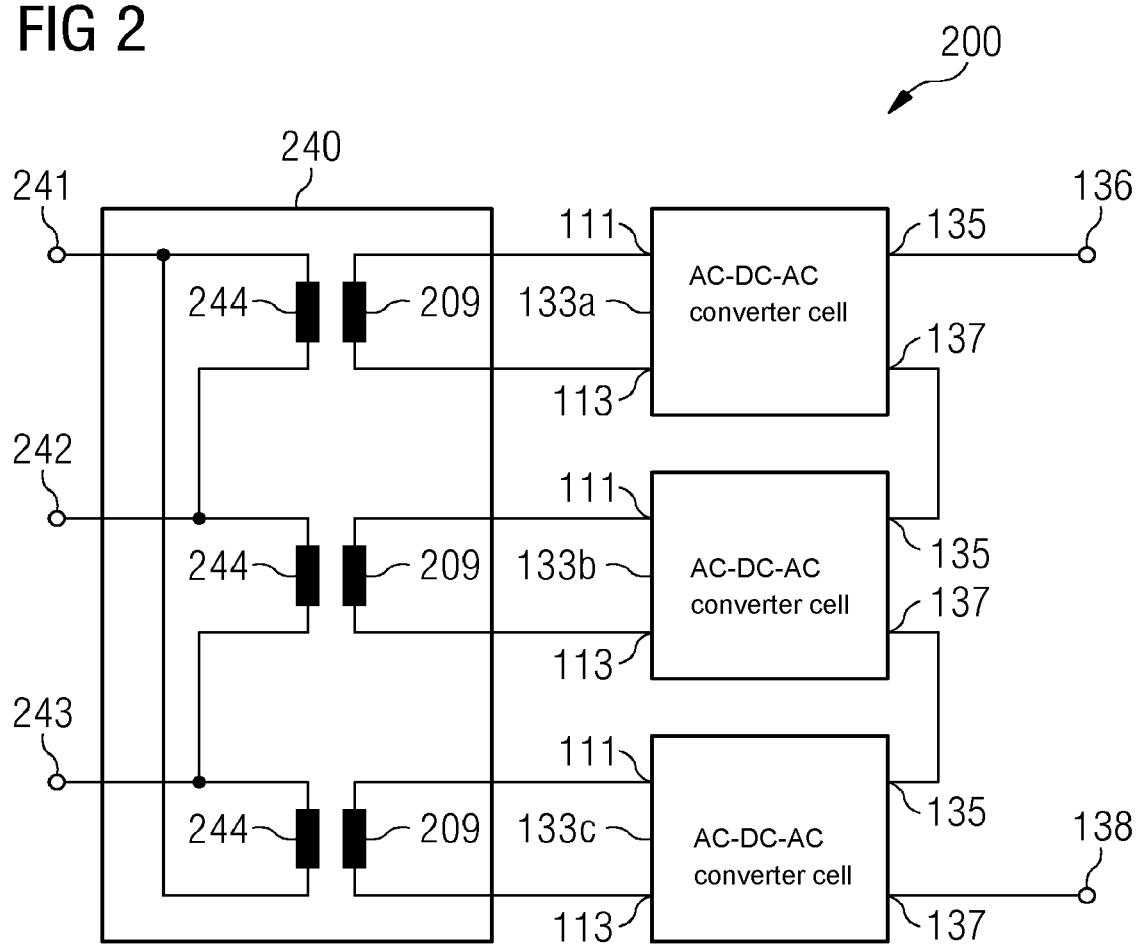
FIG. 2 schematically illustrates an arrangement for providing an AC current to a load including three AC-DC-AC converter cells, such as the converter cell illustrated in FIG. 1, according to an embodiment.

FIG. 2 schematically illustrates an arrangement 200 for providing an AC current to a load according to an embodiment. The arrangement includes three converter cells 133a, 133b, 133c, as illustrated in FIG. 1.

The arrangement 200 illustrated in FIG. 2 includes a transformer 240 having three transformer input terminals 241, 242, 243. The three transformer input terminals 241, 242, 243 are connected to three primary windings 244. Thereby, the windings 244 are connected in series. The primary windings 244 include wires wound around ferromagnetic material comprised in the transformer 240.

Inductively coupled to the three primary windings 244 are secondary winding portions 109, wherein each secondary winding portion 109 has a wire wound around ferromagnetic material and inductively coupled to a respective primary winding 244. The secondary windings 109 are isolated from each other. Thereby, the transformer 240 has in total six transformer output terminals, each of the three secondary winding portion providing two terminals 111, 113.

The arrangement 200 for proving an AC current to a load further includes three AC-DC-AC converter cells 133 (denoted as 133a, 133b, 133c). Each of the converter cells 133 receives two of the six transformer output terminals 111, 113. Each cell 133 receives the output terminals 111, 113 belonging to a particular secondary winding 109. The cells 133a, 133b, 133c illustrated in FIG. 2 are constructed and configured as the cell 133 illustrated in FIG. 1.

Each cell 133 has two converter cell output terminals 135 and 137. As can be taken from FIG. 2, the first converter cell output terminal 135 of the first converter cell 133a is connectible to a load, and also the second converter cell output terminal 137 of the third converter cell 133c is connectible to a load, in order to provide a single phase output to a load, such as a pipeline.

The second converter cell output terminal 137 of the first cell 133a is connected with the first converter output terminal 135 of the second cell 133b. The second converter cell output terminal 137 of the second converter cell 133b is connected to the first converter cell output terminal 135 of the third converter cell 133c. Thereby, the cells 133a, 133b and 133c are connected in series.

According to an embodiment, a master control system (not illustrated) is provided. The master control system may, for example, control synchronization of the three single phase converters 133a, 133b, 133c illustrated of FIG. 2. The master control system may provide pulse width modulation signals to semiconductor switches in the converters in order to achieve a symmetrical input load on the three transformer input terminals 241, 242, 243.

Figure 3:
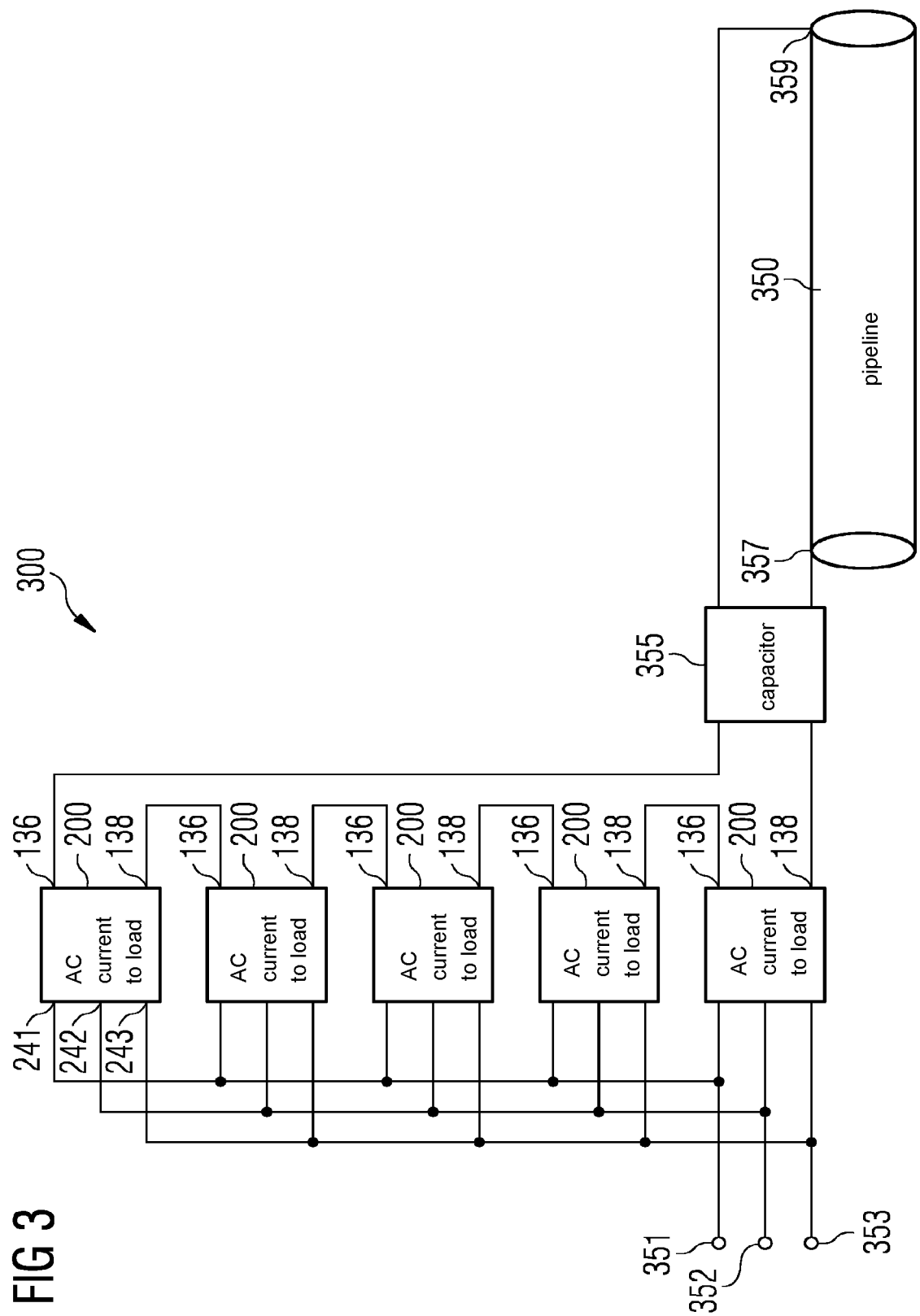
FIG. 3 schematically illustrates a pipeline heating arrangement for providing an AC current to a pipeline for heating the pipeline according to an embodiment, wherein the arrangement includes five seriously connected arrangement as illustrated in FIG. 2.

FIG. 3 schematically illustrates a pipeline heating arrangement 300 including five arrangements 200 illustrated in FIG. 2. Each arrangement 200 for providing an AC current to a load 350 includes three transformer input terminals 241, 242 and 243, which are connected to an energy supply providing the electric energy in three electrical phases 351, 352, 353.

As can be taken from FIG. 3, the arrangements 200 illustrated in FIG. 3, are connected in series. In particular the respective second output terminal of the arrangements 200 (i.e., the output terminal 138) is connected to a respective first output terminal (i.e., the output terminal 136) of the next arrangement 200 in the series. The first output terminal 136 of the first arrangement 200 and the second output terminal 138 of the last arrangement 200 are connected to a compensating capacitor 355, which is connected to a first position 357 and a second position 359 of a pipeline 350. Thereby, the arrangement 300 provides an AC current through the pipeline 350 flowing from the first position 357 to the second position 359.

Figure 4:
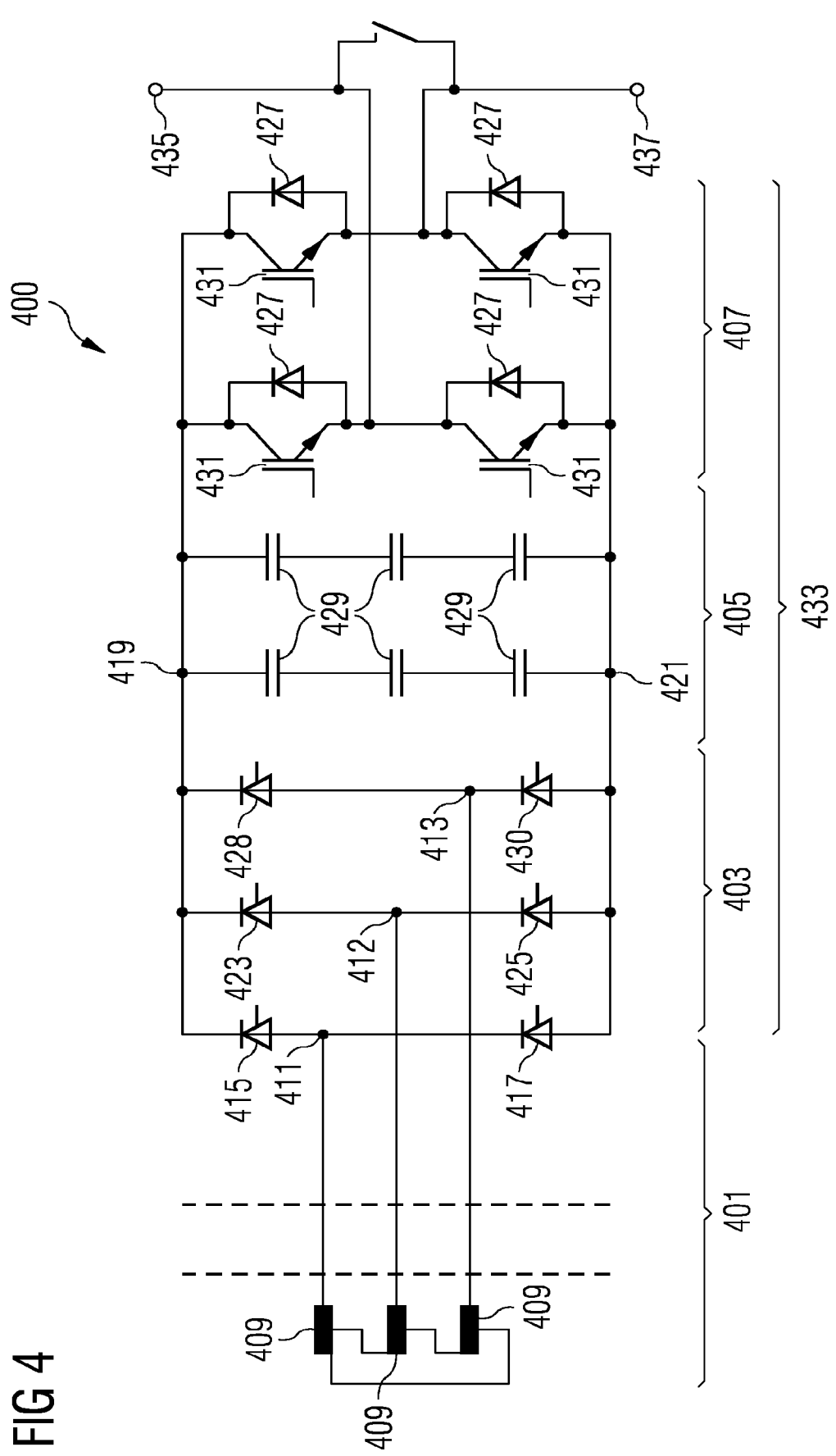
FIG. 4 schematically illustrates an arrangement for providing an AC current to a load according to an embodiment.

FIG. 4 schematically illustrates an arrangement 400 for providing an AC current to a load. The arrangement 400 includes a transformer portion 401, an AC-DC section 403, a capacitor section or DC-link 405 and a DC-AC section 407. The arrangement 400 can form a direct electrical heating (DEH) power supply, and the AC-DC section 403, the DC-link 405 and the DC-AC section 407 can form a power cell 433 of a converter.

In contrast to the embodiment illustrated in FIG. 1, the arrangement 400 includes a transformer portion 401, which includes three secondary windings 409. The three secondary windings 409 are connected in series, wherein each of the secondary winding portions 409 is inductively coupled to a respective primary winding of a transformer, such as the transformer 240 illustrated in FIG. 2.

Each of the secondary winding portions 409 provides a voltage to the three converter cell input terminals 411, 412 and 413. Thus, the converter cell 433 includes three converter cell input terminals 411, 412, 413 to support three phases.

The arrangement 400 further includes a first thyristor 415 and a second thyristor 417, which are connected in series between two DC output nodes 419, 421. The first converter cell input terminal 411 is connected between the first thyristor 415 and the second thyristor 417.

The arrangement 400 further includes a third thyristor 423, a fourth thyristor 425, a fifth thyristor 428 and a sixth thyristor 430. The third thyristor 423 and the fourth thyristor 425 are connected in series between the DC output nodes 419, 421, and also the fifth thyristor 428 and the sixth thyristor 430 are connected in series between the two DC output nodes 419, 421. Further, the second converter cell input terminal 412 is connected between the third thyristor 423 and the fourth thyristor 425. Further, the third converter cell input terminal 413 is connected between the fifth thyristor 428 and the sixth thyristor 430.

The capacitor section 405 includes capacitors 429 arranged and connected as in the embodiment illustrated in FIG. 1.

Further, the DC-AC section 407 includes IGBTs 431 and diodes 427 configured and arranged as in the embodiment illustrated in FIG. 1.

The arrangement 400 has a first converter cell output terminal 435 and a second converter cell output terminal 437. A load, such as the pipeline 350, illustrated in FIG. 3, may be connected directly or via one or more compensating capacitors to the converter cell output terminals 435 and 437 or to a series connection of several serially connected arrangements 400. In particular, the arrangements 200 illustrated in FIG. 3 may be replaced by the arrangements 400 illustrated in FIG. 4 or by the arrangements 500 illustrated in FIG. 5 (described below) to supply electric energy for heating the load 350.

In particular, FIG. 4 illustrates a cell topology with a thyristor rectifier section 403. The main advantages with the thyristors are that the thyristors can perform a soft start, shut down locally, if the cell should fail and can keep a constant DC voltage, if the input voltage is varying. In addition, the thyristors can be controlled to give a symmetrical input current even if the DC link voltage has a load side frequency dependent ripple.

Figure 5:
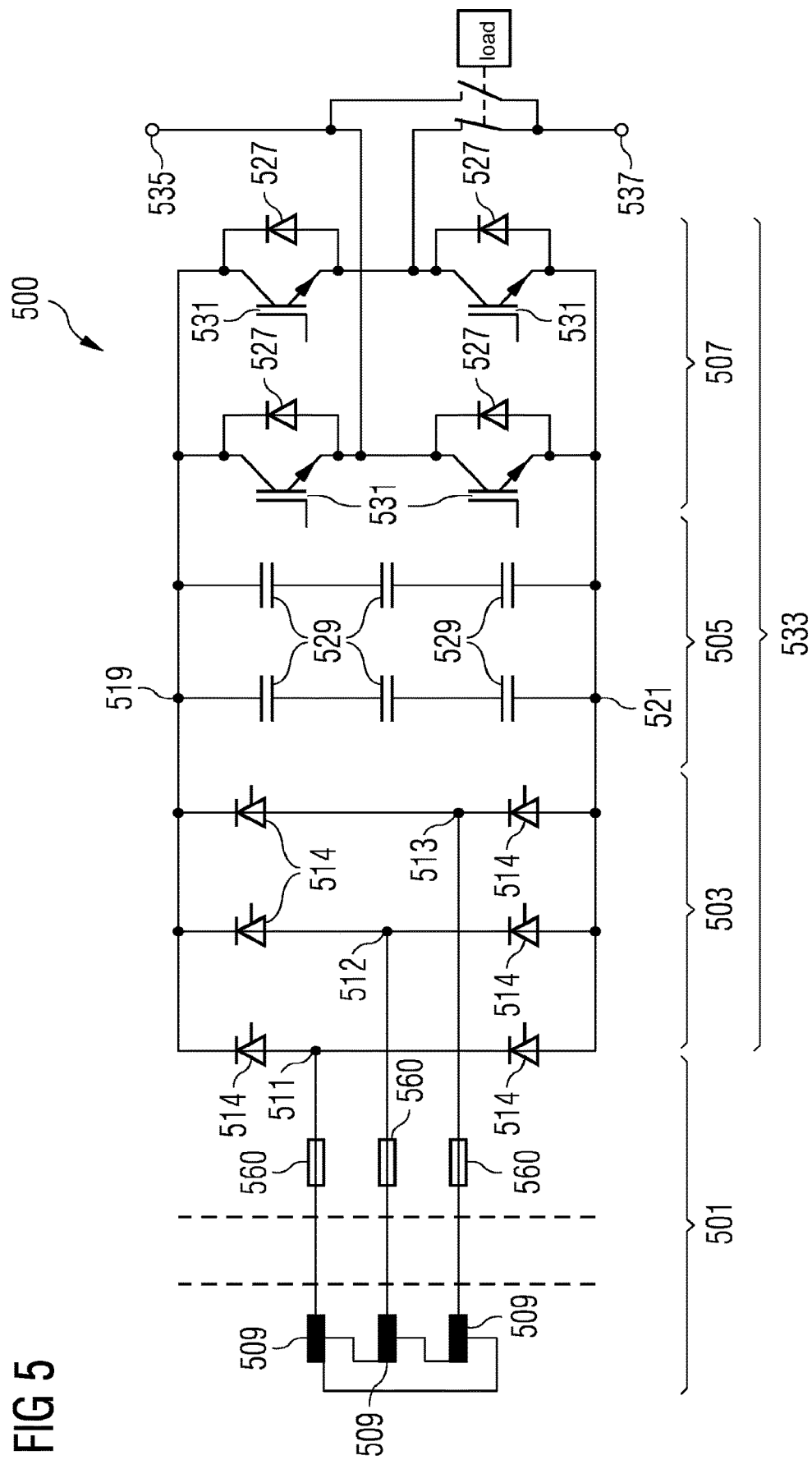
FIG. 5 schematically illustrates an arrangement for providing an AC current to a load according to a still other embodiment.

FIG. 5 schematically illustrates an arrangement 500 for providing an AC current to a load. The arrangement 500 shows similarities to the arrangement 400 illustrated in FIG. 4. Elements similar in structure and/or function in FIGS. 4 and 5 are labelled by reference signs differing only in the first digit.

In contrast to the arrangement 400 illustrated in FIG. 4, the arrangement 500 illustrated in FIG. 5 does not use thyristors 415, 417, 423, 425, 428, 430 connected between DC output nodes but uses diodes 514. Two diodes 514 are serially connected between the DC output nodes 519 and 521. Thereby, three pairs of the serially connected diodes 514 are connected in parallel. Each of the three input terminals 511, 512, 513 of the converter cell 533 is connected between two serially connected respective diodes 514.

The arrangement 500 further includes fuses 560, which are connected between the input terminals 511, 512, 513 and the secondary winding portions 509 in order to protect the arrangement 500 from over-current.

In particular, FIG. 5 illustrates a cell topology with diode rectifier 503.

The input transformer has one primary winding and one secondary winding for each cell 533. The different secondary phases are phase shifted to give a high pulse number impact on the mains. In the case of a breakdown in the cell components, the input fuses 560 will blow and isolate the faulty cell 533, while the others can continue operating.

The rectifier 503 is a simple diode bridge and a precharging circuit on one transformer winding is provided.

The output IGBT inverter 507 in H-bridge configuration is controlled in a Pulse Width Modulation mode to give a controllable fundamental sine wave output.

The DC capacitor 505 is dimensioned to buffer the second harmonic pulsating power to a single-phase system with a limited voltage ripple. A short circuit contactor at the output will in case of cell failure isolate and short the faulty cell and allow the rest of the converter operate with reduced peak power capacity.

Figure 6:
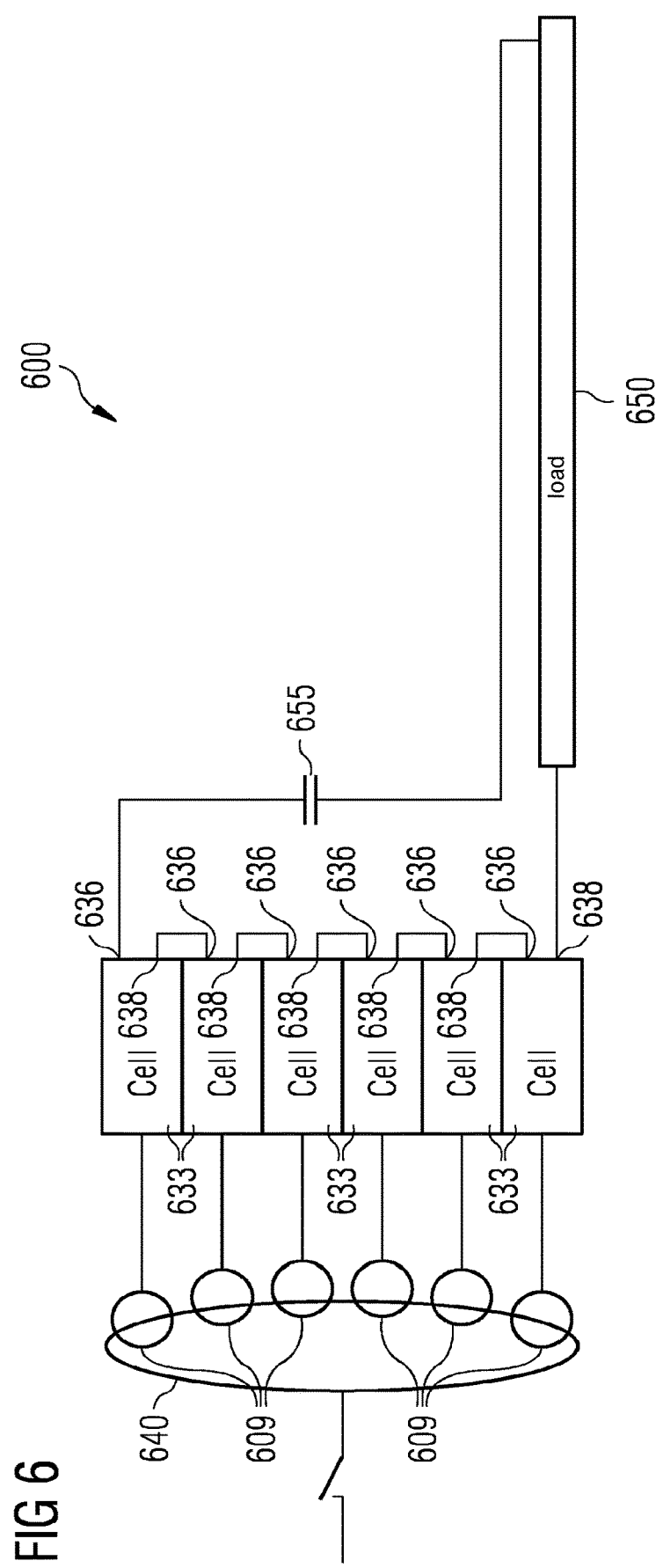
FIG. 6 and FIG. 7 schematically illustrate heating arrangements for providing an AC current to a pipeline including a plurality of AC-DC-AC converter cells according to embodiments.

FIG. 6 schematically illustrates another pipeline heating arrangement 600 including a number of converter cells, such as cells 100, 400 or 500 illustrated in FIG. 1, 4 or 5. A transformer 640 includes, for example, a number of six secondary winding portions 609. The secondary winding portions 609 provide either two phases or three phases to each of the cells 633. The cells 633 are serially connected to provide an appropriate voltage to the load 650, wherein the capacitor 655 acts as a compensating capacitor.

In particular, FIG. 6 illustrates a 6-cell converter with series capacitor compensation.

In this configuration, the load reactance is balanced with a series connected capacitor 655. When tuned correctly, the load impedance seen from the converter is resistive, and the converter output components are used to produce active power only.

The transformer 640 has to be specifically made for the cell converter with separate secondary windings, with medium volt insulation, for each cell. If necessary, transformer 640 may be divided into 2 or 3 separate units. A converter with 6 series connected blocks will be capable of 4.1 kV and 1600 A (6.6 MW).

Figure 7:
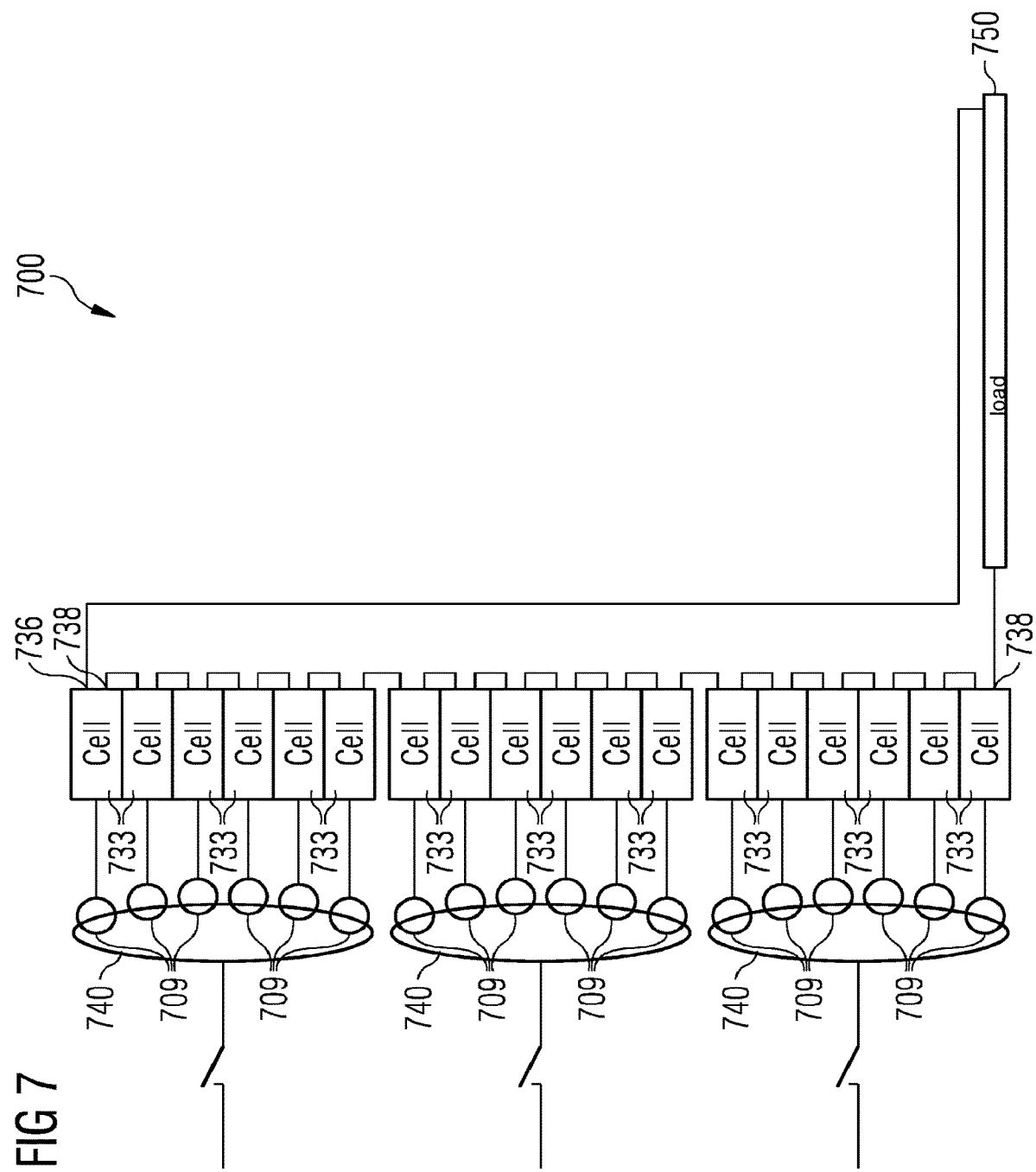

FIG. 7 illustrates a pipe heating arrangement 700 according to an embodiment. Three transformers 740 are employed, each transformer 740 providing electric energy to six secondary winding portions 709. Each secondary winding portion 709 is connected via two or three terminals to a cell 733, such as cells 133, 433, 533 illustrated in FIGS. 1, 4, 5, respectively. Since the arrangement 700 provides a three times higher voltage compared to the arrangement 600 illustrated in FIG. 6, a compensating capacitor 655 may be avoided.

It is possible to avoid the series connected capacitor by using a converter for full voltage and full current. Since each cell 733 may give, for example, a maximum of 690 V AC, 18 cells may be series connected to give 12 kV. Instead of the tree separate transformers shown on FIG. 7, a single transformer with 18 secondary windings could also be used.

In this case, the cell is made for low cos φ, with a transformer and rectifier part rated for 300 kW pr cell. The inverter and DC-link capacitor is to be rated for 1600 A as for the capacitor compensated system.

Figure 8:
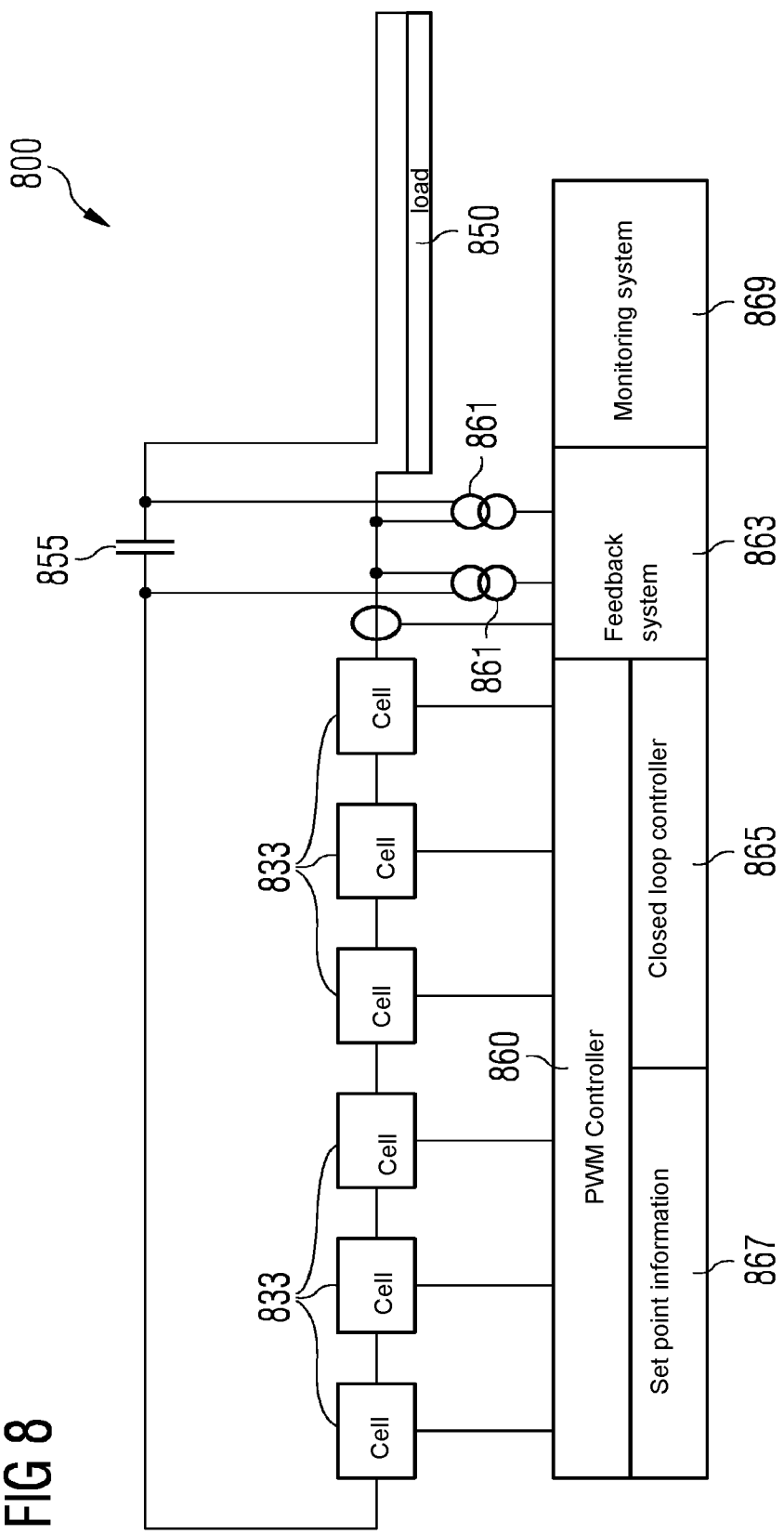
FIG. 8 schematically illustrates a pipeline heating arrangement according to an embodiment, where the arrangement includes plural AC-DC-AC converter cells.

FIG. 8 schematically illustrates a pipeline heating arrangement 800 for heating a pipeline 850 by direct electrical heating using a series connection of cells 833, such as cells 133, 433 or 533 illustrated in FIG. 1, 4 or 5, respectively.

The cells 833 are powered by not illustrated transformers. The thyristors 115, 117, 415, 417, 423, 425, 428, 430 illustrated in FIG. 4, and the IGBT 123, 125 illustrated in FIG. 1 are controlled regarding their conductivities by a pulse with modulation control 860, which supplies control signals to corresponding gates of the thyristors and/or IGBTs. Further, the pipeline heating arrangement 800 includes a measuring system 861 for measuring voltage and/or current flowing through the pipeline 850 or between different positions of the pipeline or the whole system. Further, the arrangement 800 includes a feedback system 863, which receives measurement data of the measurement system 861 and controls the pulse with modulation control. In particular, the control is via a closed loop control 865 using set point information 867 for controlling the pulse with modulation control 860, in order to achieve desired heating power, desired voltage or desired current flow through the load 850. Thereby, the load is monitored by a monitoring system 869.

The voltage and current in the power circuit is transformed to signal level and used as feedback to the closed loop controller. The same signals are used for load circuit monitoring. The controller can be run in sine wave pulse pattern mode (no AC feedback) or in sine wave current mode (AC current feedback). In sine wave current mode, the short circuit current will be equal to the actual load current.

A special frequency controller part tunes the frequency to give a power factor better than 0.95 on the cell converter part before the compensating capacitor. Other control functions like constant power output and power input limit may be added according to demands. The output of the closed loop controller 865 is the PWM signal to the cells through optical fibre.

The load circuit impedance is monitored and checked against limits. Warnings and stop signal are given when limits are exceeded. The cooling system is monitored with respect to water level, water conductivity, water flow, and water temperature. Transformer input current and temperature is monitored.

Each cell 833 may have its own intelligence in order to minimize the communication on the optical fiber. Auxiliary power and phase information may be picked up from the 3 phase input power side. The thyristor rectifier is automatically controlled by its own intelligence which takes care of: soft start, constant DC capacitor voltage, input current symmetry, shutdown at short circuit, and overload indication. The inverter part will take its control signal from the fiber optics.

On each cell 833, there may be a monitoring function for: heat sink temperature, DC capacitor voltage, thyristor current symmetry, possible thyristor fault, and IGBT switching function. The monitoring status is transferred through a separate optic fiber from each cell to a central unit.

Most power components, like power semiconductors, DC capacitors, filter inductors and resistors, in the cell are water cooled with de-ionised water. Therefore, the power density in the cell may be high, and the margins in current rating of the components are kept low.

The DC capacitor may be an Aluminium Electrolytic Capacitor, designed for base plate cooling.

When using diodes instead of thyristors, the DC voltage will vary according to the input voltage. The rated inverter voltage may have to be reduced in order to keep the maximum DC working voltage below maximum rating of the DC capacitor. Therefore, the cell has to be derated with a factor proportional to the voltage variation range. It is convenient that the input fuses are the standard 690 V type. The transformer output voltage should therefore not exceed 700 V.

The compensating capacitor may be connected in series with the cable in order to reduce the voltage seen from the converter. When the capacitor is tuned to give the same reactance as the cable at the operating frequency, the converter will work at a power factor close to unity, and the stress and loss in the converter components are minimized. If the system is to be used with variable frequency or on different cables (pipe lines), the capacitor value is varied accordingly.

Advantages of the cell converter system according to embodiments may be:
- The output power and output frequency is continuously variable (compensating capacitor is tuned to frequency).
- The system is tolerant to harmonics on the mains.
- The converter cell is standardized, cells can be stacked up to the necessary power or voltage.
- The losses of the cells are dissipated to water, the air condition capacity can be reduced.
- High reliability due to redundancy, possibility to bypass one cell on the case of cell failure.
- Possible to use the same converter on different pipes (easy power regulation).
- Rapid electronic switch-off in the case of load-cable breakdown.

It may be possible to implement power setting without steps and soft start.

By using power electronics, it is possible to vary the output frequency. A higher frequency than 50 Hz or 60 Hz may improve the power efficiency on the heating system. If the output frequency is to be varied, the compensating capacitor is varied accordingly.

The state of the art system is tuned to match the specific pipe line impedance when installed. The power electronic system can be used on different pipe lines that demand approximately the same energy for heating. If the reactances of the different pipe lines are different, the compensating capacitor may be retuned, or different frequencies for the different pipe lines may be used.

This new power electronic circuit for DEH according to an embodiment may fit in the available room on an oil or gas platforms leg 8 m×3 m and may be divided in units small enough to be hoisted down through a hatch in the floor with the size 2.35 m×1.65 m. As an alternative, space on the pipe deck may also be used with a container solution.

The modularity of the cell converter may enable a redundant system where a cell may be bypassed in the case of breakdown without the loss of heating power.

The arrangement for a DEH pipeline heating system may perform three different tasks: Convert 3 phase power to single phase power; Provide optimum output frequency and power for the load; and Compensate for the low power factor of the load, which may approximately be 0.25.

The DC current link converter using thyristors may have a unit power rating of 2.5 MW with an operating AC voltage of 1500 V. Several units may easily be paralleled, but are not so easily series connected. An output transformer may be used to match the impedance in the load circuit.

Several DC voltage link converters using IGBT's may be series connected for power and voltage increase into a multi cell converter. This converter can work with series capacitor compensation, and an output transformer may be omitted.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

I claim:

1. A direct electrical heating power supply comprising:
a converter comprising at least one AC-DC-AC converter cell, the at least one AC-DC-AC converter cell having an AC-DC section, a DC link and a DC-AC section,
a first, a second and a third converter AC input, wherein the first converter AC input is connectable to a first secondary winding of a three phase transformer, the second converter AC input is connectable to a second secondary winding of the three phase transformer, and the third converter AC input is connectable to a third secondary winding of the three phase transformer, a converter AC output connectable to an electrically conductive pipeline section forming a single phase load for direct electrical heating of the pipeline section, wherein the converter is configured to supply AC electric power to the single phase load and to distribute the load equally between the first, the second and the third converter AC inputs, wherein an output frequency of the AC electric power is tuned to a reactance of the pipeline section.

2. The direct electrical heating power supply according to claim 1, wherein the at least one AC-DC-AC converter cell comprises at least three AC-DC-AC converter cells, a first AC-DC-AC converter cell providing the first converter AC input, a second AC-DC-AC converter cell providing the second converter AC input and a third AC-DC-AC converter providing the third converter AC input, wherein AC outputs of the at least three AC-DC-AC converter cells are connected in series to provide the converter AC output, the at least three AC-DC-AC converter cells being configured to synchronize the generation of an AC voltage by DC-AC sections of the at least three AC-DC-AC converter cells to provide a single phase AC output at the converter AC output.

3. The direct electrical heating power supply according to claim 1, wherein the at least one AC-DC-AC converter cell comprises three AC inputs providing the first, the second and the third converter AC inputs, wherein the AC-DC section of the at least one AC-DC-AC converter cell is configured to convert a three phase AC voltage received on the first, the second and the third converter AC inputs into a common DC voltage on a DC link, thereby symmetrising the load on the first, the second and the third converter AC inputs.

4. The direct electric heating power supply according to claim 1, wherein the at least one AC-DC-AC converter cell comprises a first converter output terminal and a second converter output terminal, wherein the first converter output terminal is connectable with the load, wherein at all three inputs of a three phase transformer, a symmetrical load is achievable by controlling the at least one AC-DC-AC converter cell.

* * * * *